J. PARENT.
PROCESS OF PRESERVING MEAT.

No. 180,627. Patented Aug. 1, 1876.

UNITED STATES PATENT OFFICE.

JOSEPH PARENT, OF PHILADELPHIA, PA., ASSIGNOR TO HIMSELF AND GUSTAVUS F. SCHNEIDER, OF SAME PLACE.

IMPROVEMENT IN PROCESSES OF PRESERVING MEAT.

Specification forming part of Letters Patent No. 180,627, dated August 1, 1876; application filed July 15, 1876.

*To all whom it may concern:*

Be it known that I, JOSEPH PARENT, of Philadelphia, in the county of Philadelphia and State of Pennsylvania, have invented certain new and useful Improvements in Process of Curing Meat and Packing; and I do hereby declare that the following is a full, clear, and exact description thereof, which will enable others skilled in the art to which it appertains to make and use the same, reference being had to the accompanying drawing, and to the letters of reference marked thereon, which form a part of this specification.

The nature of my invention consists in a process for preserving beef, as will be hereinafter more fully set forth.

Figure 1:
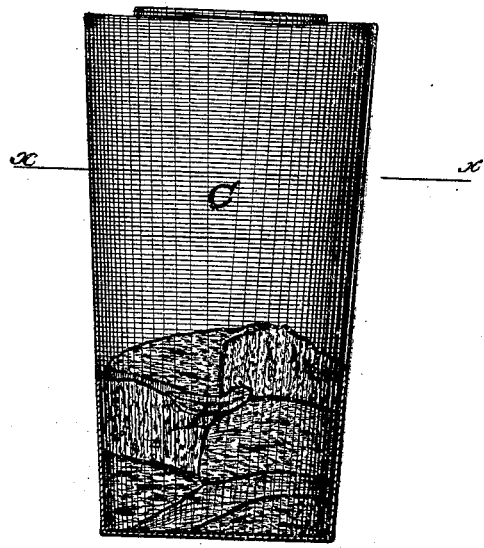
Figure 2:
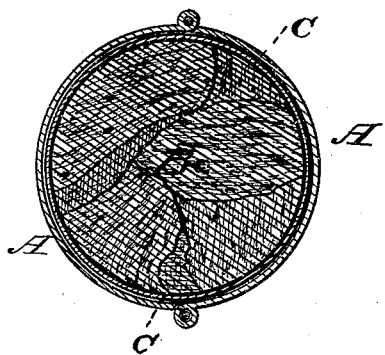

In the annexed drawing, Figure 1 is a side elevation of a can of my prepared beef broken open, to show the interior thereof. Fig. 2 is a cross-section of the same on the line $x\,x$, Fig. 1.

To prepare the meat, it is first boned and cut up and placed in cold water to soak for about two hours. I then prepare a pickle of water, salt, saltpeter, cloves, and cinnamon, with a little chloride of lime to purify the pickle. Some spice is then added, after being first scalded, and bicarbonate of soda is also added, to keep the meat tender. The meat is taken out of the cold water and placed in this pickle, where it is allowed to remain for about three days. The meat is then taken out and cooked thoroughly, and, while cooking, spice is added, so as to retain the flavor. After the meat is thus thoroughly cooked, the meat is pressed in molds or cans, and is then ready for table use.

Before, however, putting the meat in the molds or cans, a cloth is placed around the meat while it is being pressed, for the purpose of keeping the meat in a good and clean condition when ready for use.

In the drawing, A is the can; B, the meat, and C the cloth.

I am aware that meat has been cooked, preserved, and pressed into cans, and I do not, therefore, claim such as my invention.

Having thus fully described my invention, what I claim as new, and desire to secure by Letters Patent, is—

The within-described process for preserving meat, consisting of soaking the same in cold water, then in a pickle of water, salt, saltpeter, cloves, cinnamon, chloride of lime, spice, and bicarbonate of soda, and then cooking it and pressing it into molds or cans, substantially as herein set forth.

In testimony that I claim the foregoing as my own I affix my signature in presence of two witnesses.

JOSEPH PARENT.

Witnesses:
WM. B. UPPERMAN,
C. H. WATSON.